United States Patent
Burky et al.

(10) Patent No.: US 7,290,261 B2
(45) Date of Patent: Oct. 30, 2007

(54) METHOD AND LOGICAL APPARATUS FOR RENAME REGISTER REALLOCATION IN A SIMULTANEOUS MULTI-THREADED (SMT) PROCESSOR

(75) Inventors: William Elton Burky, Austin, TX (US); Bjorn Peter Christensen, Austin, TX (US); Dung Quoc Nguyen, Austin, TX (US); David A. Schroter, Round Rock, TX (US); Albert Thomas Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 10/422,651

(22) Filed: Apr. 24, 2003

(65) Prior Publication Data

US 2004/0216120 A1    Oct. 28, 2004

(51) Int. Cl.
*G06F 9/46* (2006.01)

(52) U.S. Cl. ..................... 718/107; 712/229
(58) Field of Classification Search ................ 718/100, 718/107; 712/32, 43, 228, 229, 23; 711/133
See application file for complete search history.

(56) References Cited

U.S. PATENT DOCUMENTS

| | | | | |
|---|---|---|---|---|
| 5,630,149 | A * | 5/1997 | Bluhm ........................ | 712/217 |
| 5,822,602 | A | 10/1998 | Thusoo | |
| 5,996,068 | A * | 11/1999 | Dwyer et al. ................ | 712/228 |
| 6,073,231 | A * | 6/2000 | Bluhm et al. ................ | 712/218 |
| 6,092,175 | A * | 7/2000 | Levy et al. ................... | 712/23 |
| 6,138,230 | A * | 10/2000 | Hervin et al. ................ | 712/216 |
| 6,170,051 | B1 * | 1/2001 | Dowling ...................... | 712/225 |
| 6,212,544 | B1 * | 4/2001 | Borkenhagen et al. ...... | 718/103 |
| 6,286,027 | B1 * | 9/2001 | Dwyer et al. ................ | 718/107 |
| 6,356,918 | B1 * | 3/2002 | Chuang et al. .............. | 707/203 |
| 6,381,676 | B2 * | 4/2002 | Aglietti et al. .............. | 711/133 |
| 6,549,930 | B1 | 4/2003 | Chrysos et al. | |
| 6,847,576 | B2 | 1/2005 | Ranganathan | |
| 6,883,107 | B2 * | 4/2005 | Rodgers et al. ............. | 713/601 |
| 2001/0054057 | A1 | 12/2001 | Long et al. | |
| 2002/0163520 | A1 | 11/2002 | Hardin et al. | |
| 2002/0194251 | A1 | 12/2002 | Richter et al. | |
| 2003/0033509 | A1 | 2/2003 | Leibholz et al. | |
| 2004/0054876 | A1 | 3/2004 | Grisenthwaite et al. | |
| 2006/0037025 | A1 | 2/2006 | Janssen et al. | |

* cited by examiner

*Primary Examiner*—Van Nguyen
(74) *Attorney, Agent, or Firm*—Mitch Harris, Atty at Law, LLC; Andrew M. Harris; Casimer K. Salys

(57) ABSTRACT

A circuit and method provide rename register reallocation for simultaneous multi-threaded (SMT) processors that redistributes rename (mapped) resources between one thread during single-threaded (ST) execution and multiple threads during multi-threaded execution. The processor receives an instruction specifying a transition from a single-threaded to a multi-threaded mode or vice-versa and halts execution of all threads executing on the processor. The internal control logic then signals the resources to reallocate the resources. Rename resources are reallocated by directing an action at the rename mapper. When switching from SMT to ST mode, the mapper is directed to drop entries for the dying thread, but on a switch from ST to SMT mode, "dummy" instruction group dispatch indications are sent to the mapper that indicate use of all architected registers for each thread.

19 Claims, 5 Drawing Sheets

METHOD AND LOGICAL APPARATUS FOR RENAME REGISTER REALLOCATION IN A SIMULTANEOUS MULTI-THREADED (SMT) PROCESSOR

CROSS-REFERENCE TO RELATED APPLICATIONS

The present application is related to U.S. patent applications: Ser. No. 10/422,648, entitled "METHOD AND LOGICAL APPARATUS FOR MANAGING THREAD EXECUTION IN A SIMULTANEOUS MULTI-THREADED (SMT) PROCESSOR", issued as U.S. Pat. No. 7,155,600 on Dec. 26, 2006, Ser. No. 10/422,649, entitled "METHOD AND LOGICAL APPARATUS FOR MANAGING RESOURCE REDISTRIBUTION IN A SIMULTANEOUS MULTI-THREADED (SMT) PROCESSOR", currently pending, and Ser. No. 10/422,682, entitled "DYNAMIC SWITCHING OF MULTITHREADED PROCESSOR BETWEEN SINGLE THREADED AND SIMULTANEOUS MULTITHREADED MODES", also currently pending, and filed concurrently with this application. The specifications of the above-referenced patent applications are incorporated herein by reference.

BACKGROUND OF THE INVENTION

1. Technical Field

The present invention relates generally to processors and computing systems, and more particularly, to a simultaneous multi-threaded (SMT) processor.

2. Description of the Related Art

Present-day high-speed processors include the capability of simultaneous execution of instructions, speculative execution and loading of instructions and simultaneous operation of various resources within a processor. In particular, it has been found desirable to manage execution of one or more threads within a processor, so that more than one execution thread may use the processor without generating conflicts between threads and while using processor resources more effectively than they are typically used by a single thread.

Prior processor designs have dealt with the problem of managing multiple thread via a hardware state switch from execution of one thread to execution of another thread. Such processors are known as hardware multi-threaded (HMT) processors, and as such, can provide a hardware switch between execution of one or the other thread. An HMT processor overcomes the limitations of waiting on an idle thread by permitting the hardware to switch execution to a non-idle thread. Execution of both threads can be performed not simultaneously, but by allocating execution slices to each thread when neither are idle. However, the execution management and resource switching (e.g., register swap out) in an HMT processor introduce overhead that makes the processor less efficient that a single-threaded scheme.

Additionally, resources such as queues for instructions and data, tables containing rename mapping and tag values that enable instruction execution are duplicated in an HMT processor in order to provide for switching execution between threads. While a first thread is running, a second thread's resources are typically static values that are retained while the second thread is not running so that execution of the second thread can be resumed.

However, in a simultaneous multi-threaded (SMT) processor, two or more threads may be simultaneously executing within a single processor core. In an SMT processor, the threads may each use processor resources not used by another thread, and thus true simultaneous use of the processor requires effective management of processor resources among executing threads.

Rename registers are so-called because they implement virtual registers that are actually associations between physical storage registers and one or more logical register "names" or "maps". A logical unit known as a mapper associates one or more virtual registers with a physical storage register. Further, sets of "architected" registers within rename register resources are generally allocated on a fixed basis to each thread. Reallocation of fixed entries presents a particular problem, as during execution of instruction streams for one or more threads, the mapper may fill up or fragment with maps for one or more threads, so a physical division of mapper entries within the rename resources is impractical and a logical division would require extensive internal logic or an external housekeeping unit.

In an HMT processor, the mapper and physical storage would typically be duplicated. In an SMT processor, it is desirable to allocate fixed resources within rename registers between a number of threads executing in the SMT processor.

It is therefore desirable to provide an SMT processor and rename register reallocation methodology that can effectively manage processor resources when one or more threads are executing within the processor.

SUMMARY OF THE INVENTION

The objectives of providing rename register reallocation in an SMT environment are provided in a simultaneous multi-threaded (SMT) processor incorporating thread management logic and a method of reallocating rename registers by directly targeting the rename register mapper with an action in response to a thread mode switch that changes the number of active threads executing within the SMT processor.

The processor includes an instruction decode unit that receives an instruction indicating a thread mode switch and stops execution of all threads running on the processor. A thread enable register indicating an enable state for multiple threads is read to determine what threads are selected for further execution and the processor signals one or more resources to reallocate in conformity with the thread enable state. If the thread mode switch is from a lesser number of active threads to a greater number, pseudo-dispatch logic targets the mappers by loading dummy instruction groups into an instruction sequencer unit (ISU), which implicate a number of registers within the rename resources. The number of registers is the number of required architected registers for the added thread(s). The ISU directs rename mappers to allocate architected registers for the threads added to the active state by issuing signals in conformity with the implicated registers, but does not enter the dummy instruction groups in the global completion tables. If the switch is from a greater number of active threads to a lesser number, the mapper is commanded directly to dispose of the entries for the dying thread(s). After reallocation is complete, the processor starts the threads selected for further execution.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
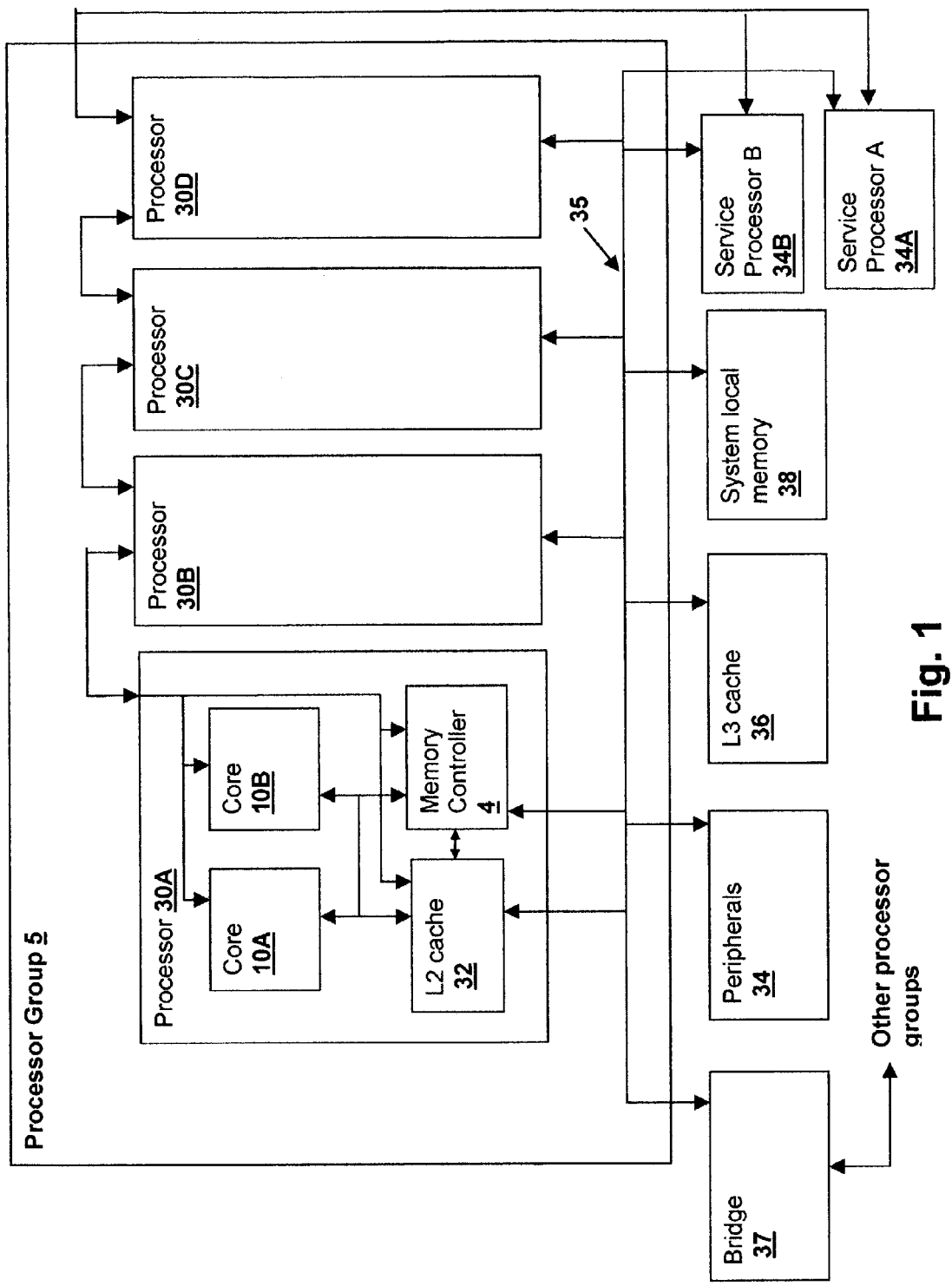
FIG. 1 is a block diagram of a system in accordance with an embodiment of the invention.

With reference now to the figures, and in particular with reference to FIG. 1, there is depicted a block diagram of a system in accordance with an embodiment of the present invention. The system includes a processor group 5 that may be connected to other processor groups via a bridge 37 forming a super-scalar processor. Processor group 5 is connected to an L3 cache unit 36 system local memory 38 and various peripherals 34, as well as to two service processors 34A and 34B. Service processors provide fault supervision, startup assistance and test capability to processor group 5 and may have their own interconnect paths to other processor groups as well as connecting all of processors 30A-D.

Within processor group 5 are a plurality of processors 30A-D, generally fabricated in a single unit and including a plurality of processor cores 10A and 10B coupled to an L2 cache 32 and a memory controller 4. Cores 10A and 10B provide instruction execution and operation on data values for general-purpose processing functions. Bridge 37, as well as other bridges within the system provide communication over wide buses with other processor groups and bus 35 provide connection of processors 30A-D, bridge 37, peripherals 34, L3 cache 36 and system local memory 38. Other global system memory may be coupled external to bridge 37 for symmetrical access by all processor groups.

Processor cores 10A and 10B are simultaneous multi-threaded (SMT) processors capable of concurrent execution of multiple threads. Processor cores 10A and 10B further support a single-threaded operating mode for efficient execution of a single thread when program execution conditions dictate single threaded operation, e.g., when high-priority program execution must be completed by a known time, or when one thread in a multi-threaded processor is known to be idle. Multi-threading introduces some inefficiencies over full-time execution of a single-thread, but overall there is a system efficiency advantage as threads are often idle waiting on other tasks to complete. Therefore transitioning between single-threaded and multi-threaded mode provides an advantage in adapting to one or more of the above-described conditions, and embodiments of the present invention provide accounting for processor time in a manner consistent with a processor that provides processor time accounting responsive to such transitions.

Figure 2:
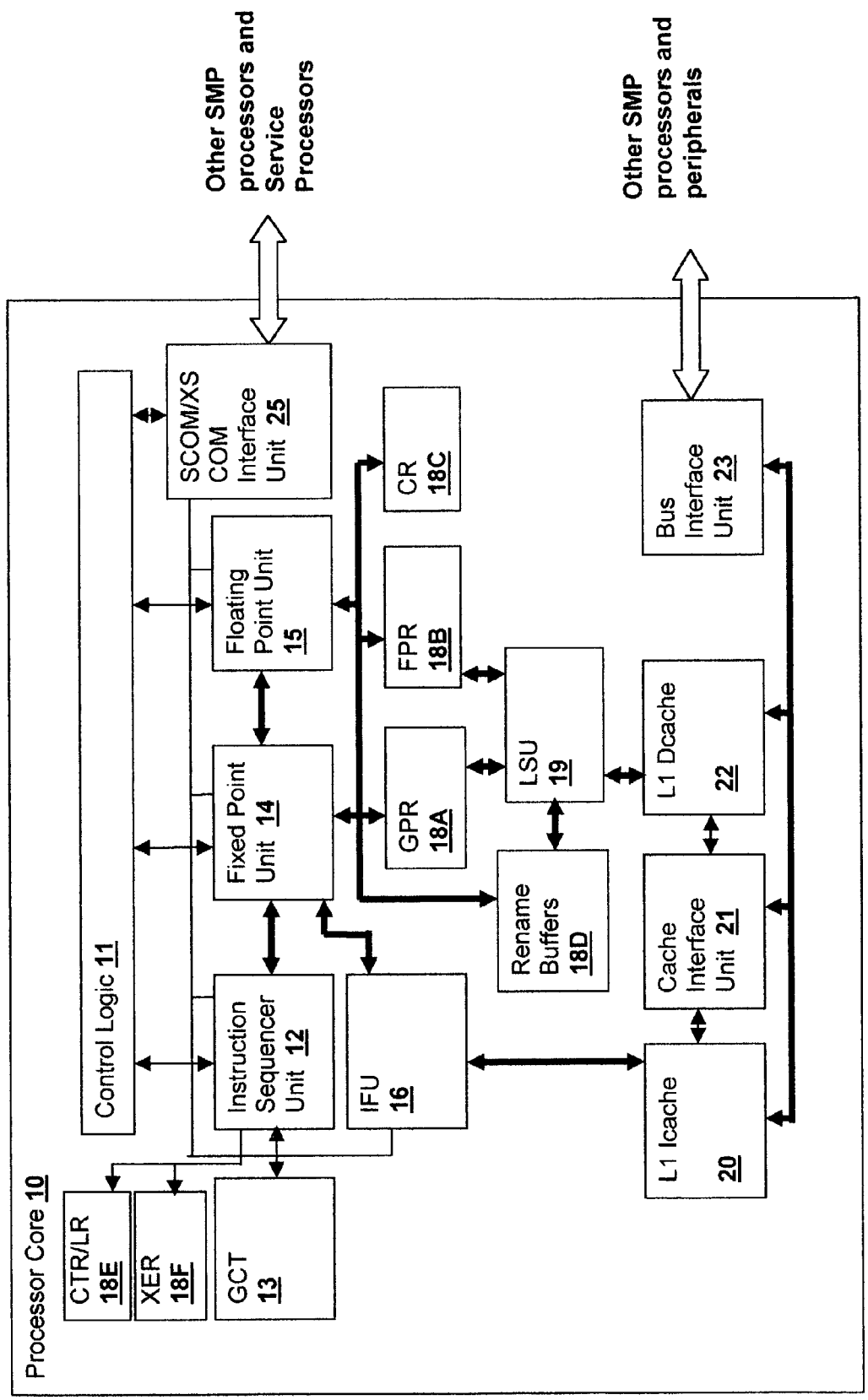
FIG. 2 is a block diagram of a processor core in accordance with an embodiment of the invention.

Referring now to FIG. 2, details of a processor core 10 having features identical to processor cores 10A and 10B is depicted. A bus interface unit 23 connects processor core 10 to other SMT processors and peripherals and connects L1 Dcache 22 for storing data values, L1 Icache 20 for storing program instructions and cache interface unit 21 to external memory, processor and other devices. L1 Icache 20 provides loading of instruction streams in conjunction with instruction fetch unit IFU 16, which prefetches instructions and may include speculative loading and branch prediction capabilities. An instruction sequencer unit (ISU) 12 controls sequencing of instructions issued to various internal units such as a fixed point unit (FXU) 14 for executing general operations and a floating point unit (FPU) 15 for executing floating point operations. Global completion tables (GCT) 13 track the instructions issued by ISU 12 via tags until the particular execution unit targeted by the instruction indicates the instructions have completed execution. Control logic 11 is coupled to various execution units and resources within processor core 10, and is used to assist in providing pervasive control of execution units and resources in accordance with the method of the present invention. An SCOM/XSCOM interface unit 25 provides a connection to external service processors 34A-B in order to provide direct control of execution units and resources for supervisory operations.

Fixed point unit 14 and floating point unit 15 are coupled to various resources such as general-purpose registers (GPR) 18A, floating point registers (FPR) 18B, condition registers (CR) 18C, rename buffers 18D, count registers/link registers (CTR/LR) 18E and exception registers (XER) 18F. GPR 18A and FPR 18B provide data value storage for data values loaded and stored from L1 Dcache 22 by load store unit (LSU) 19. CR 18C stores conditional branching information and rename buffers 18D (which may comprise several rename units associated with the various internal execution units) provides operand and result storage for the execution units. XER 18F stores fixed point exception information and CTR/LR 18E stores branch link information and count information for program branch execution.

GPR 18A, FPR 18B, CR 18C, CTR/LR 18E and XER 18F are resources that include some fixed (architected) registers that store information during execution of a program and must be provided as a fixed set for each executing thread, while other non-architected registers within the above resources are free for rename use. The fixed registers are flagged as such within the resources themselves and provide guaranteed per-thread allocation of storage space used for the storage of data values, address fields and other information during processing of instructions for each thread. The non-architected registers can be used by associated execution units for instruction processing for any thread, and therefore it is an improvement in resource utilization efficiency increase the number of available non-architected registers by freeing fixed resources (e.g., architected registers) that are not required when a thread is removed from execution. It is also mandatory to allocate fixed sets of resources for another thread when increasing the number of threads being executed within the processor (In the illustrative embodiment, when transitioning from ST to SMT mode).

On a transition (switch) from SMT to ST mode, a thread (referred to as a dying thread) that is being removed from execution on the processor is completely removed. The software directing the thread change receives indications when threads complete processing and therefore knows when a particular thread's execution is complete. The software either dispatches a new process to the thread (keeping it alive) or if there is no work to be scheduled, the software kills the thread, permitting release of all resources to the single thread that remains executing (referred to as the surviving thread). On a switch from ST to SMT mode, a thread that is restarted or revived (referred to as the reviving thread) has its context generated by the software.

In the illustrative embodiment, a "move to control register—mtctrl" instruction sets a thread enable control register within control logic 11 (but locatable in other blocks within processor core 10) that triggers an action by control logic 11 to change the thread execution state in conformity with the requested further execution state of multiple threads. But, in alternative embodiments, a specific thread mode change instruction may be implemented having an operand or field specifying a thread mode, or a thread mode register may be used in conjunction with a thread mode change instruction. The illustrations provided herein are directed primarily to a processor and method for reallocating fixed resources between an allocation supporting execution of one thread (ST mode) or an allocation supporting two threads (SMT mode), but the techniques are extensible to execution of any number of threads in SMT mode and to techniques for switching between a first SMT mode and a second SMT operating state where one or more threads are revived or disabled.

Now, in further detail, the resource reallocation mechanism of the present invention is described. Generally, methods in accordance with the present invention reallocate fixed entries within mappable storage registers amongst threads selected for further execution at the thread enable control change, i.e., those threads that are executing after the thread mode transition has been completed. In the illustrated embodiment, the reallocation is made allocating equal partitions of fixed resources for two simultaneously executing threads and a partition that includes a single partition of a fixed resource for a single executing thread, realizing symmetrical allocation of resources as between multiple threads in SMT mode and full allocation of resources in ST mode to a single thread, while providing maximum availability of resources the "unfixed" resource pool. The following table illustrates a reallocation scheme in accordance with the illustrated embodiment:

TABLE 1

| Resource | ST Mode | SMT Mode (2 threads) |
|---|---|---|
| Architected registers | | |
| GPRs | 36 | 72 |
| FPRs | 32 | 64 |
| XER | 4 | 8 |
| CR | 9 | 18 |
| LR/CTR | 2 | 4 |

Table 1 shows the various resources that are reallocated in according to the mode selected for further execution. The rename availability reallocation is based on the number of registers that do not have to be maintained for fixed storage, so a switch to ST mode frees up registers that would otherwise be fixed for multi-threaded operation.

Resource allocation in processor that support simultaneous execution for more than two threads may similarly support transitions between any number of executing threads and threads selected for further execution after a mode change (including SMT to SMT mode), by allocating the above-described fixed resources equally among the threads specified for further execution (although more physical storage may need to be provided in some resources in order to support execution of more that two threads), or according to another asymmetrical resource reallocation scheme according to other embodiments of the present invention.

Figure 3:
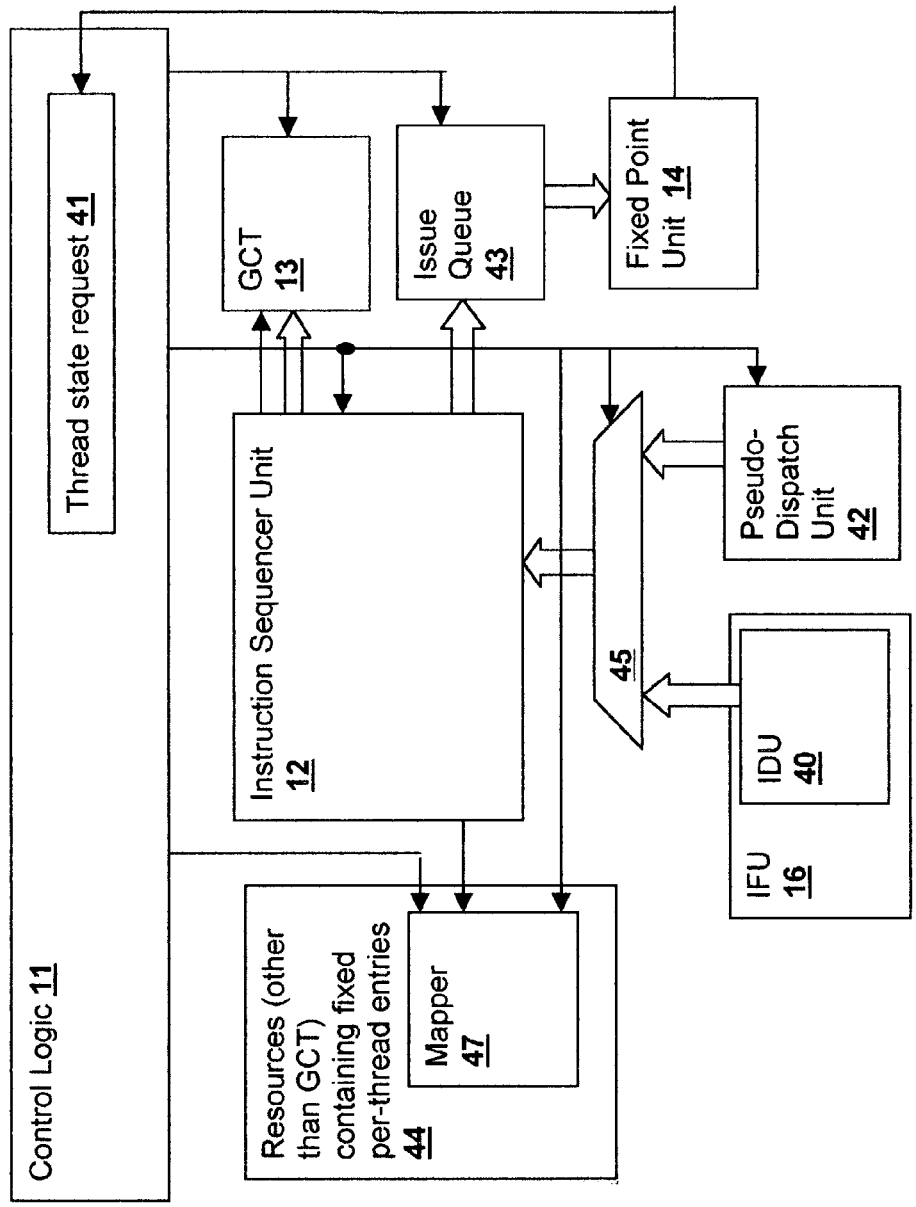
FIG. 3 is a block diagram depicting details within processor core of FIG. 2.

Referring now to FIG. 3, Control logic 11 detects the thread enable register change associated with the mtctrl command received by FXU 14 (and may ignore the command or perform alternative behaviors if control logic 11 detects that the set of executing threads has not been changed or attempts to enter an invalid state such as all threads dead). Control logic 11 then holds the thread mode register change pending internally in thread state request 41, permitting control logic 11 to make changes in accordance with the thread set selected for further execution, while not disrupting the final stages of processing for the currently executing mode. Control logic 11 then begins sequencing of processing shutdown for all of the executing threads. After all threads have been stopped, ISU 12 and control logic 11 detects the thread mode change and initiate resource reallocation. After resources have been reallocated, threads that were specified for further execution in thread state request register 41 are started. The present invention concerns targeting a mapper 47 within a resource for which fixed resources are being allocated or freed, from control logic 11 in response to a thread mode change. For a transition from SMT to ST mode, mapper 47 is signaled by control logic 11 to free the set of fixed register maps that are held for the dying thread. For a transition from ST to SMT mode, control logic 11 starts a process that causes ISU 12 to allocate fixed entries in mapper 47, by causing ISU 12 to use the same mechanism that is used for allocating non-architected entries for the processing of instruction groups.

To accomplish the above, a pseudo-dispatch unit 42 is coupled to ISU 12 via a multiplexer 45. A second input of the multiplexer is provided by the output of an instruction dispatch unit (IDU) 40 within IFU (16) that provides the path for loading of executable instructions to ISU 12. When control logic 11 selects the output of pseudo-dispatch unit 42 rather than IDU 40, pseudo-dispatch unit 42 loads a sequence of dummy instructions into ISU 12 that implicate the number of additional fixed per-thread resources shown (in the ST mode column and doubled for the SMT mode column) in Table 1 needed for the reviving thread. As a specific example, 36 GPR 18A architected registers are needed per thread and only one non-architected register is allocated per instruction, so 9 dummy instruction groups including 4 instructions each are issued "spoofed" per cycle to ISU 12, causing the allocation of 36 locations within resource 44 and mapper 47. Under normal operating conditions, mapper 47 would map the 36 locations as non-architected (as they would be temporary storage for the processing of instructions). However, control logic 11 further signals mapper 47 to allocate entries with a fixed attribute to the particular reviving thread. Therefore, after completion of the dummy instruction processing sequence, resource 44 is left with 36 entries architected for the reviving thread. The required number of resources will always be available, as quiescing the processor operation between switching thread modes guarantees that all instructions will be complete. Therefore, there will be no currently used non-architected registers in use to store temporary values.

Further pertinent to the operation of the present invention is the behavior of GCT 13 and Issue Queue 43 during sequencing by ISU 12 of the dummy instructions. Dummy instructions are not placed in issue queue 43 (which may in actuality be a number of issues, each associated with a particular execution unit) and entries for the instructions are further not placed in GCT 13. The above-described behavior may be implemented by control logic signaling GCT 13 and issue queue 43 directly as depicted, or TSU 12 may be modified to not perform the issue queue 43 loading or GCT 13 entry writing. The above-described disabled activity ensures that ISU 12 only generates the mapper 47 entries and that the dummy instructions generate no further actions.

Figure 4:
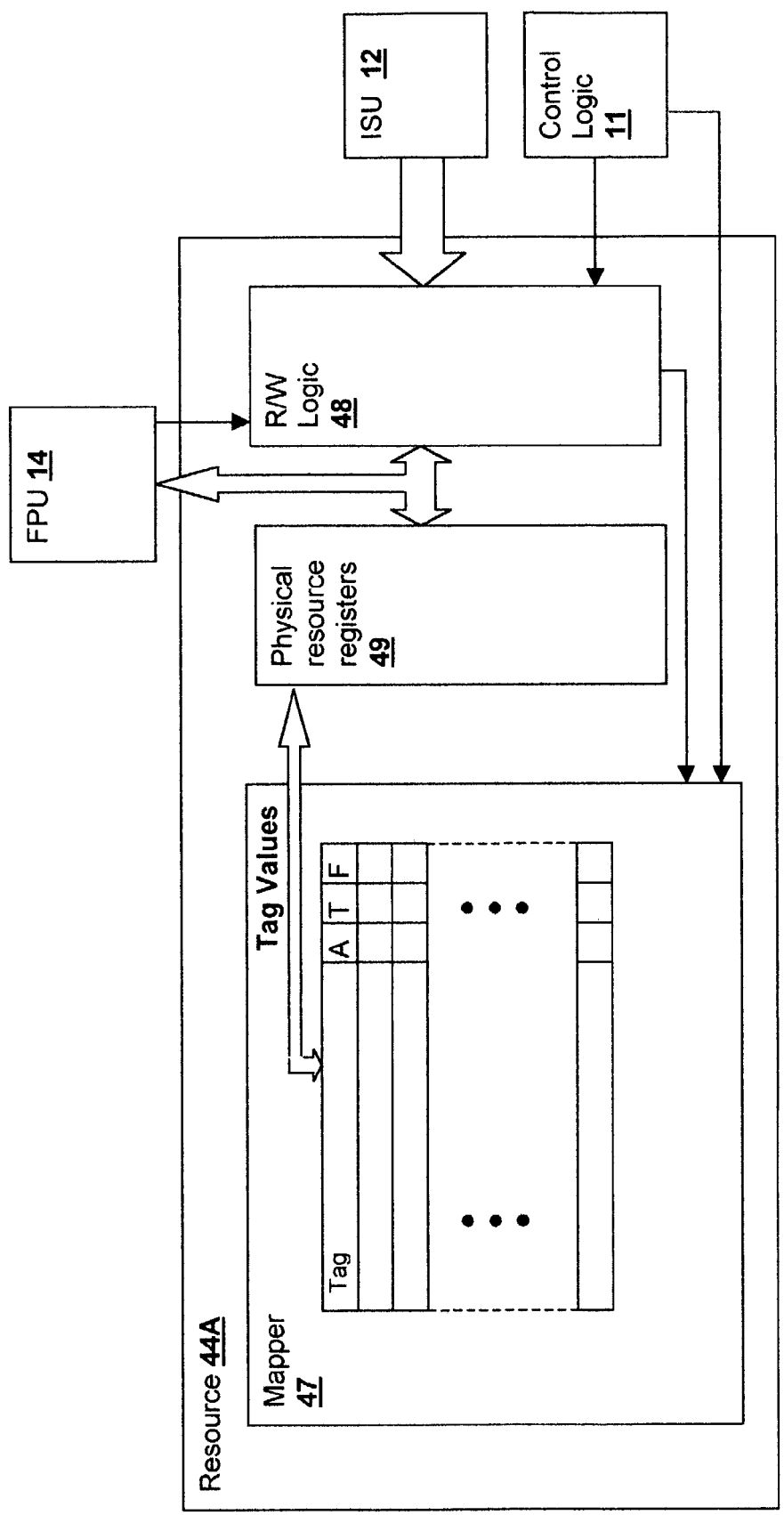
FIG. 4 is a block diagram depicting details of resource 44A in accordance with an embodiment of the present invention.

Referring now to FIG. 4, details of resource 44A are shown in accordance with an embodiment of the present invention. Mapper 47 comprises storage that hold tag values, along with three flags for each entry. Each of the entries corresponds to a map to one of physical resource registers 49. Read/write logic 48 transfers data between physical resource registers and external units coupled to resource 44A (shown here as a connection to FPU 14) and also generates entries in mapper 47 for values written by ISU 12, including the entries generated for dummy instructions issued by ISU 12 in response to pseudo-dispatch unit 42. Flags placed in mapper 47 entries control the status of entries. Flag "A" indicates an architected register that cannot be freed (other than in accordance with the reallocation of the present invention). Flag "T" indicates associated threads 0 and 1 (a field may be used to support more that two threads) and flag "F" indicates whether the entry is free "1" or in use "0". As mentioned above, after thread processing is quiesced for all threads, all entries should be "free" other than those architected for one or more threads that was/were executing prior to the quiesce.

On a thread mode switch, after the quiesce has taken effect, if the switch is to ST mode, mapper 47 receives a signal from control logic 11 to set all of the free bits for mapper entries associated with the dying thread, i.e., those registers for which the T bit matches the thread number. The logic can include freeing non-architected registers since they should already be free. On a transition to SMT mode, control logic 11 signals mapper to allocate entries with the A bit set when pseudo-dispatch unit 42 is loading dummy instructions, causing mapper 47 to generate architected entries.

Figure 5:
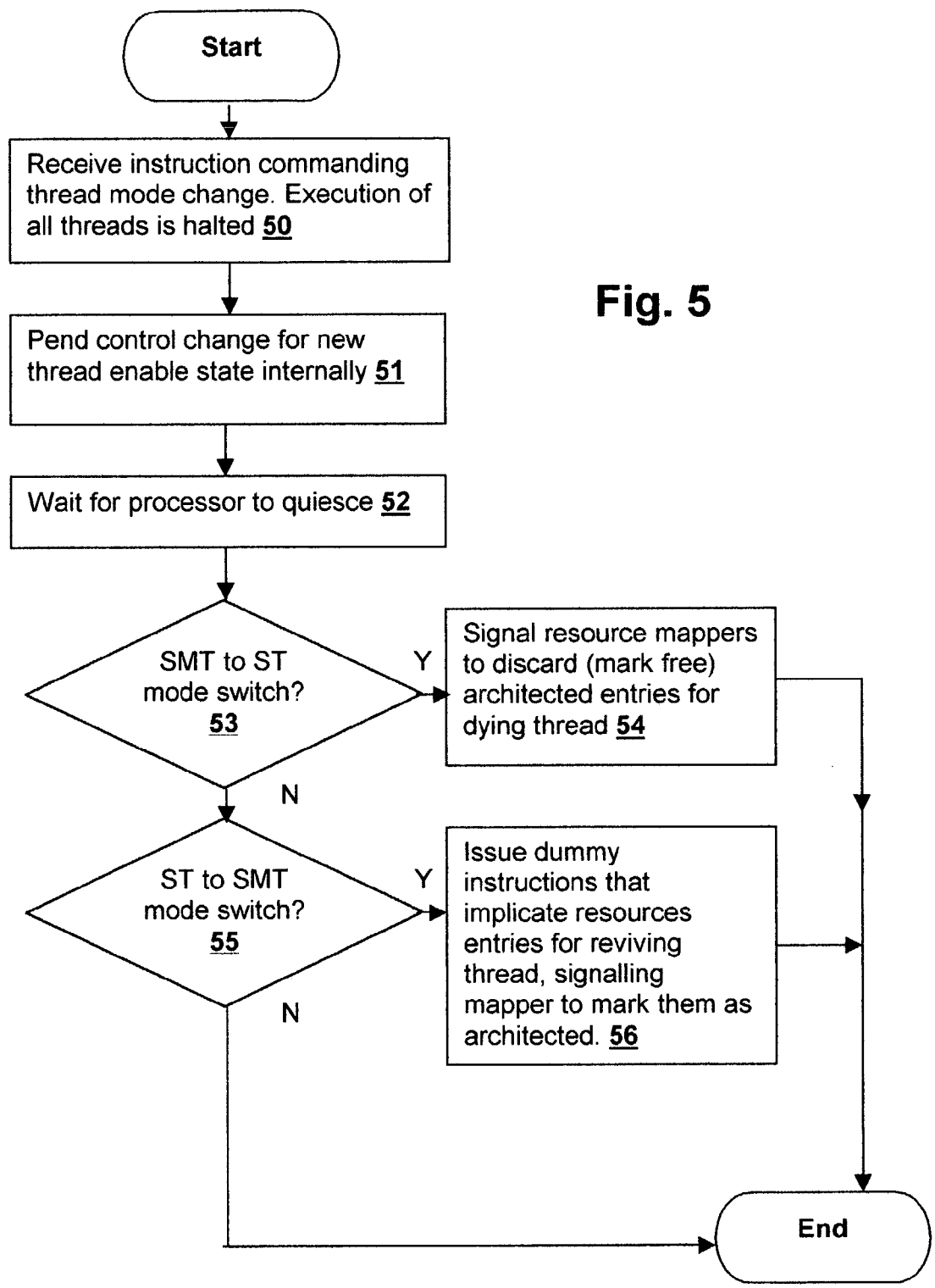
FIG. 5 is a flowchart depicting a method in accordance with an embodiment of the present invention.

Referring now to FIG. 5, a method in accordance with an embodiment of the present invention is depicted in a flowchart. When an instruction is received commanding a thread mode change (step 50), the control change is held internal to control logic 11 (step 51) and further action waits for processor 10 to quiesce (step 52). If the mode switch requested is for a change from SMT to ST mode (decision 53), resource mappers are signaled to discard architected entries for the dying thread (step 54). Otherwise, if the switch is from ST to SMT mode (decision 55), dummy instructions are issued that implicate (use) resource entries for the reviving thread, signalling the mapper to mark them as architected (step 56).

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method for managing transitions between a first number of threads and a second number of threads executing a simultaneous multi-threaded processor, comprising:

receiving an instruction indicating a thread mode switch;

setting thread enable signals indicating an enable state of multiple threads, wherein said second number of threads is specified for further execution; and reallocating per-thread fixed entries within a rename resource of said processor in conformity with said thread enable signals, by directing an action at a mapper associated with said rename resource that maps said per-thread fixed entries, wherein said mapper reallocates said per-thread fixed entries so that when a given one of said multiple threads is not specified for further execution, said per-thread fixed entries previously associated with said given thread are separately usable to store distinct values by at least one thread of said second number of threads, wherein said second number of threads is greater than said first number of threads, and wherein said reallocating comprises issuing dummy instruction dispatches implicating a predetermined fixed number of rename registers within said rename resource to an instruction sequencer, whereby said instruction sequencer commands said mapper to allocate said predetermined number of new entries within said rename resource for at least one additional thread specified for further execution.

2. The method of claim 1, wherein said first number of threads is greater than said second number of threads, and wherein said reallocating directs a signal at said mapper causing said mapper to discard said per-thread fixed entries for at least one thread not specified for further execution.

3. The method of claim 2, wherein said discarding of said per-thread fixed rename resource entries is performed by clearing all of a plurality bits indicating an architected state from said per-thread fixed entries within said mapper associated with said at least one thread not specified for further execution.

4. The method of claim 1, wherein said reallocating further comprises directing an architect signal at said mapper, whereby said mapper fixes said new entries within said rename resource as said per-thread fixed entries.

5. The method of claim 1, further comprising:

receiving an instruction dispatch at said instruction sequencer unit;

determining whether said instruction dispatch is a dummy instruction dispatch; and only in response to determining said instruction dispatch is not a dummy instruction dispatch, issuing said instruction dispatch to at least one issue queue and a completion table.

6. The method of claim 1, wherein said reallocating reallocates per-thread fixed entries within general purpose registers and fixed point registers by sending dummy dispatch instructions implicating a first predetermined number of new entries within said general purpose registers and a second predetermined number of new entries within said fixed point registers.

7. The method of claim 1, wherein said reallocating reallocates per-thread fixed entries within conditional branching registers by sending dummy branching dispatches implicating said predetermined number of new entries within said conditional branching registers.

8. The method of claim 1, wherein said reallocating reallocates per-thread fixed entries within exception registers by sending dummy exception-setting instruction dispatches implicating said predetermined number of new entries within said exception registers.

9. The method of claim 1, further comprising selecting at said instruction sequencer, input from an instruction dispatch unit or a dummy dispatch unit, wherein said dummy dispatch unit is selected in response to receipt of said thread mode switch indicating instruction, whereby said instruction sequencer subsequently receives said dummy instruction dispatches.

10. A processor supporting concurrent execution of multiple threads, said processor comprising:

an instruction decoder supporting a decode of a thread mode change instruction;

a thread enable register for receiving a thread enable state specifying a requested enable state of multiple threads specified for further execution;

at least one resource including rename registers for supporting execution of instructions within said processor, said rename registers including per-thread fixed entries mapped by a mapper; and control logic coupled to said instruction decoder for controlling execution units of said processor in response to said thread mode change instruction, wherein said control logic controls said mapper in order to reallocate said per-thread fixed entries in conformity with said requested enable state of said multiple threads, and wherein said mapper reallocates said per-thread fixed entries so that when a previously-enabled thread is not specified for further execution, said per-thread fixed entries previously associated with said previously-enabled thread are separately usable to store distinct values by at least one of said multiple threads specified for further execution, wherein said requested enable state requests an increase in the number of threads executing within said processor, and wherein said processor further comprises an instruction dispatch unit for dispatching instructions, an instruction sequencer unit coupled to said instruction dispatch unit for receiving instruction dispatches and coupled to said at least one resource for requesting allocations within said at least one resource in response to said received instruction dispatches, and a pseudo-dispatch unit coupled to said instruction sequencer unit for issuing dummy instruction dispatches implicating a predetermined fixed number of rename registers within said resource to said instruction sequencer, and wherein said instruction sequencer commands said mapper to allocate said predetermined number of new entries within said resource for at least one additional thread specified for further execution, whereby said control logic controls said mapper.

11. The processor of claim 10, wherein said requested enable state requests a decrease in the number of threads executing within said processor, and wherein said control logic signals said mapper to discard said per-thread fixed entries for at least one thread not specified for further execution.

12. The processor of claim 11, wherein said mapper clears all of a plurality bits indicating an architected state from said per-thread fixed entries within said mapper associated with said at least one thread not specified for further execution in response to said signal from said control logic.

13. The processor of claim 10, wherein said control logic directs an architect signal at said mapper, whereby said mapper fixes said new entries within said resource as said per-thread fixed entries.

14. The processor of claim 10, further comprising a multiplexer having an output coupled to said instruction sequencer, a first input coupled to said pseudo-dispatch unit and a second input coupled to said instruction dispatch unit, whereby an output of said pseudo-dispatch unit is selected for issuing said dummy dispatches to said instruction sequencer by said control logic in response to receiving said thread mode change instruction.

15. The processor of claim 10, wherein said instruction sequencer is coupled to at least one issue queue for receiving issued instructions and a completion table for tracking queued instruction completion, and wherein said instruction sequencer only queues instructions in said at least one issue queue and tags said instructions in said completion table when receiving instructions from said instruction dispatch unit.

16. The processor of claim 10, wherein said pseudo-dispatch unit issues dummy instructions implicating a first predetermined number of new entries within a set of general purpose registers and a second predetermined number of new entries within a set of fixed point registers.

17. The processor of claim 10, wherein said pseudo-dispatch unit issues dummy branching instructions implicating a first predetermined number of new entries within a set of conditional branching registers.

18. The processor of claim 10, wherein said pseudo-dispatch unit issues dummy exception-setting instructions implicating said predetermined number of new entries within a set of exception registers.

19. A processor supporting concurrent execution of multiple threads, said processor comprising:

at least one resource including rename registers for supporting execution of instructions within said processor, said rename registers including per-thread fixed entries mapped by a mapper;

an instruction dispatch unit for dispatching said instructions;

an instruction sequencer unit coupled to said instruction dispatch unit for receiving instruction dispatches and coupled to said at least one resource for requesting allocations within said at least one resource in response to said received instruction dispatches;

a pseudo-dispatch unit coupled to said instruction sequencer unit for issuing dummy instruction dispatches implicating a predetermined fixed number of said rename registers within said resource to said instruction sequencer;

a multiplexer having an output coupled to said instruction sequencer, a first input coupled to said pseudo-dispatch unit and a second input coupled to said instruction dispatch unit;

an instruction decoder supporting a decode of a thread mode change instruction;

a thread enable register for receiving a thread enable state specifying a requested enable state of multiple threads specified for further execution; and control logic coupled to said instruction decoder for controlling execution units of said processor in response to said thread mode change instruction, and wherein said control logic is coupled to a select input of said multiplexer, whereby said output of said pseudo-dispatch unit is selected for issuing said dummy dispatches to said instruction sequencer by said control logic in response to receiving said thread mode change instruction.

* * * * *